United States Patent
Kim et al.

(10) Patent No.: US 12,091,238 B2
(45) Date of Patent: Sep. 17, 2024

(54) PHOTOVOLTAIC POWER GENERATION MODULE INSTALLATION SUPPORT SYSTEM

(71) Applicant: SAMSUNG C&T CORPORATION, Seoul (KR)

(72) Inventors: Dong Shik Kim, Yongin-si (KR); Ji Hwan Yoon, Gimhae-si (KR); Kuk Hwan Kim, Seoul (KR); Jae Seung Cho, Guri-si (KR)

(73) Assignee: SAMSUNG C&T CORPORATION, Seoul (KR)

( * ) Notice: Subject to any disclaimer, the term of this patent is extended or adjusted under 35 U.S.C. 154(b) by 0 days.

(21) Appl. No.: 18/549,328

(22) PCT Filed: Mar. 11, 2022

(86) PCT No.: PCT/KR2022/003421
§ 371 (c)(1),
(2) Date: Sep. 6, 2023

(87) PCT Pub. No.: WO2022/191654
PCT Pub. Date: Sep. 15, 2022

(65) Prior Publication Data
US 2024/0150113 A1 May 9, 2024

(30) Foreign Application Priority Data

Mar. 12, 2021 (KR) .................. 10-2021-0032672

(51) Int. Cl.
*B65D 88/54* (2006.01)
*B65G 47/29* (2006.01)
*B66C 1/02* (2006.01)

(52) U.S. Cl.
CPC ............ *B65D 88/54* (2013.01); *B65G 47/29* (2013.01); *B66C 1/0243* (2013.01)

(58) Field of Classification Search
CPC ................................ B65G 47/29; B65D 88/54
See application file for complete search history.

(56) References Cited

U.S. PATENT DOCUMENTS

| | | | |
|---|---|---|---|
| 8,657,125 B2 * | 2/2014 | Hsieh | A47G 29/00 206/707 |
| 10,422,179 B2 * | 9/2019 | Goldfinch | B60P 7/06 |

(Continued)

FOREIGN PATENT DOCUMENTS

| | | |
|---|---|---|
| JP | H08-222435 A | 8/1996 |
| JP | 2006-293257 A | 10/2006 |

(Continued)

OTHER PUBLICATIONS

International Search Report issued in PCT/KR2022/003421; mailed Jun. 27, 2022.

(Continued)

*Primary Examiner* — Jonathan Snelting
(74) *Attorney, Agent, or Firm* — Studebaker & Brackett PC (57) ABSTRACT

A photovoltaic power generation module installation support system according to the present invention comprises: a conveyor device, which assembles a plurality of photovoltaic power generation modules into one string and moves same in one direction; and a loading cart including an accommodation space in which the string moved from the conveyor device is loaded in the direction that is horizontal to the ground, wherein the conveyor device includes one or more end stoppers for providing a vertical alignment line of the photovoltaic power generation module first arranged at one end of the conveyor device.

5 Claims, 11 Drawing Sheets

(a)

(b)

(56) References Cited

U.S. PATENT DOCUMENTS

| | | | |
|---|---|---|---|
| 11,228,275 B2* | 1/2022 | Miller | H02S 10/00 |
| 2006/0226093 A1* | 10/2006 | Cho | H01L 21/6734 |
| | | | 211/41.14 |
| 2012/0198682 A1 | 8/2012 | Potter et al. | |
| 2014/0360552 A1 | 12/2014 | Britcher et al. | |

FOREIGN PATENT DOCUMENTS

| | | |
|---|---|---|
| KR | 10-2012-0016193 A | 2/2012 |
| KR | 10-1727125 B1 | 4/2017 |
| KR | 10-2020-0133303 A | 11/2020 |

OTHER PUBLICATIONS

"Notice of Final Rejection" Office Action issued in KR 10-2021-0032672; mailed by the Korean Intellectual Property Office on Aug. 18, 2023.

"Notice of Allowance" Office Action issued in KR 10-2021-0032672; mailed by the Korean Intellectual Property Office on Sep. 25, 2023.

\* cited by examiner

PHOTOVOLTAIC POWER GENERATION MODULE INSTALLATION SUPPORT SYSTEM

CROSS-REFERENCE TO RELATED APPLICATIONS

This application is the U.S. National Stage of International Application No. PCT/KR2022/003421 filed Mar. 11, 2022, which claims benefit of priority to Korean Patent Application No. 10-2021-0032672 filed Mar. 12, 2021, the entire content of which is incorporated herein by reference.

TECHNICAL FIELD

The present invention relates to a photovoltaic power generation module installation support system.

BACKGROUND ART

Since [photovoltaic power generation] which uses photovoltaic cells to extract energy from sunlight and directly converts the photovoltaic energy into electrical energy, does not generate vibration, noise, or waste during the power generation, the photovoltaic power generation has fewer restrictions in installation compared to other power generation methods. Thus, in general, a place with no value in use, for example, a roof of a building, has been used. In recent years, the construction of large-scale photovoltaic power generation plants is becoming frequent due to policy changes and $CO_2$ emission restraints.

A photovoltaic cell is constituted by elements that convert absorbed light energy into electrical energy by a photovoltaic effect. Commonly, the elements are connected in series and used in a state called a [module] or [panel] protected by a resin or tempered glass.

The photovoltaic panels are electrically connected to each other in a serial configuration to provide a module. A circuit combination of 10 modules to 20 modules is called a string, and a parallel arrangement of strings is called an array. The array is installed on a specific support (MMS: module mounting structure).

The photovoltaic power generation module is made of a semiconductor, and since the element is very sensitive to an impact, care has to be taken in handling.

According to the circumstances, a special system is required for assembling, transporting, and installing a module that has a weight that is difficult for a person to handle and is sensitive to an impact.

DISCLOSURE OF THE INVENTION

Technical Problem

An object of the present for solving the above problems is to provide a system that effectively support installation of a photovoltaic power generation module.

Technical Solution

A photovoltaic power generation module installation support system according to the present invention for achieving the above object includes a conveyor device, which assembles a plurality of photovoltaic power generation modules with one string and moves the plurality of photovoltaic power generation modules in one direction, and a loading cart comprising an accommodation space in which the string moved from the conveyor device is loaded in a direction parallel to the ground, wherein the conveyor device includes one or more end stoppers configured to provide a vertical alignment line of the photovoltaic power generation module that is disposed first at one end of the conveyor.

In an embodiment, the conveyor device may include a spacing material protruding between the plurality of photovoltaic power generation modules to secure a spaced distance between the photovoltaic power generation modules, and a horizontal bar configured to a horizontal alignment line of the plurality of photovoltaic power generation modules.

In an embodiment, the conveyor may include a cylinder which is provided in a lower frame, on which the photovoltaic power generation modules are disposed, and is operated by a pneumatic pressure or hydraulic pressure, and the spacing material may protrude between the photovoltaic power generation modules by the pneumatic cylinder.

In an embodiment, the loading cart may include a rectangular parallelepiped base frame including a plurality of vertical frames and horizontal frames, and a spacer provided to be slidable or rotatable in a groove provided in each of the plurality of vertical frames so that a portion of the spacer is disposed to protrude toward the accommodation space.

In an embodiment, the spacer may include a triangular sliding-type spacer having a triangular shape that is slidable by a fixing screw on an inclined groove disposed in the groove.

In an embodiment, the spacer may include a hatch-type spacer that is rotatable by using a first fixing screw disposed in the groove as a rotation axis and is configured to control a rotation angle by a second fixing screw provided below the first fixing screw so as to support the string.

In an embodiment, the spacer may include a ratchet-type spacer that is rotated in one direction by using a fixing screw fixed to the groove as a rotation axis, wherein a portion of the ratchet portion may be disposed to protrude toward the accommodation groove.

In an embodiment, the loading cart may further include a center marker configured to mark a center of an upper frame of the base frame, wherein the center marker may include any one of a ring-shaped center marker and a straight center marker.

In an embodiment, the photovoltaic power generation module installation support system may further include a lifting device comprising a vacuum suction plate configured to generate a vacuum pressure so as to adsorb the uppermost surface of the photovoltaic power generation modules accommodated and stacked in the accommodation space, thereby unloading the photovoltaic power generation modules, and a transport vehicle configured to load and transport the loading cart.

In an embodiment, the lifting device may include a horizontal support and a vertical support, which fix the vacuum suction plate and a guide bar having a length greater than that of the vertical support, and the loading cart may include a guide groove provided so that the guide bar is inserted to be movable in a vertical direction, wherein the guide groove is disposed in a direction perpendicular to a horizontal plane on the base frame of the loading cart and is provided in pair at corresponding positions of the facing frames.

Advantageous Effects

According to the present invention, when the photovoltaic power generation plant is installed, the productivity and the efficiency, and the convenience of the work may be improved, and the installation costs may also be reduced.

According to the present invention, when the photovoltaic power generation plant is installed, the damage such as the cracks of the photovoltaic power generation module may be minimized when the photovoltaic power generation module is moved or lifted.

BRIEF DESCRIPTION OF THE DRAWINGS

(a) of FIG. 4 is a plan view of a conveyor on which a string is disposed, and (b) of FIG. 4 is a side view of the conveyor on which the string is disposed.

MODE FOR CARRYING OUT THE INVENTION

Since the present invention may have diverse modified embodiments, specific embodiments are illustrated in the drawings and are described in the detailed description of the invention. However, this does not limit the present invention within specific embodiments, and it should be understood that the present invention covers all the modifications, equivalents, and replacements within the idea and technical scope of the present invention. In descriptions of each drawing, like reference numerals refer to like elements throughout.

It will be understood that although the terms of first, second, A, and B are used herein to describe various elements, these elements should not be limited by these terms. These terms are used only to distinguish one component from other components. For example, a first element referred to as a first element in an embodiment can be referred to as a second element in another embodiment without departing from the scope of the appended claims. The terms 'and/or' means that one or more or a combination of relevant constituent elements is possible.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

In the following description, the technical terms are used only for explaining a specific exemplary embodiment while not limiting the present invention. The terms of a singular form may include plural forms unless referred to the contrary. The meaning of 'include' or 'comprise' specifies a property, a region, a fixed number, a step, a process, an element and/or a component but does not exclude other properties, regions, fixed numbers, steps, processes, elements and/or components.

Unless defined otherwise, all terms used herein, including technical or scientific terms, have the same meaning as commonly understood by one of ordinary skill in the art. Terms such as terms that are generally used and have been in dictionaries should be construed as having meanings matched with contextual meanings in the art. In this description, unless defined clearly, terms are not ideally, excessively construed as formal meanings.

In the entire specification and claims, when it is described that one comprises (or includes or has) some elements, it should be understood that it may comprise (or include or has) only those elements, or it may comprise (or include or have) other elements as well as those elements if there is no specific limitation.

Hereinafter, an installation method using the vacuum lifting device after pre-assembly according to the present invention will be described in detail with reference to the accompanying drawings.

Figure 1:
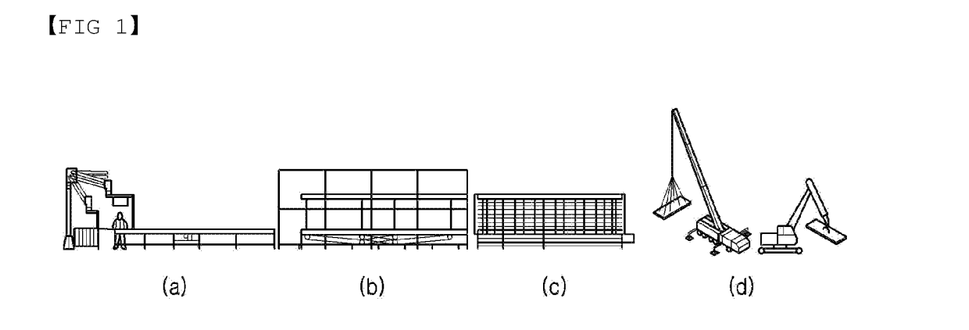
FIG. 1 is a schematic view of a photovoltaic power generation module installation support system according to the present invention.

FIG. 1 is a schematic view of a photovoltaic power generation module installation support system according to the present invention.

As illustrated in FIG. 1, a photovoltaic power generation module installation support system according to the present invention includes a conveyor (a) for pre-assembling a photovoltaic power generation module (hereinafter referred to as a module), a loading device (b) for loading the photovoltaic power generation module, a loading cart (c) for loading the photovoltaic power generation module, and a lifting device (d) for unloading the loaded photovoltaic power generation module.

The conveyor (a) and the loading device (b) are provided in an area blocked from the outside to perform a work without being affected by the weather. In addition, the conveyor (a) and the loading device (b) may be pre-assembled under environments with stable illumination and power, which are blocked from the outside to improve work efficiency.

A rear surface of each of modules may be disposed facing upward on the conveyor (a) for the pre-assembly to perform works as wiring connection between the modules by manpower. An air balance for unpacking the photovoltaic power generation module may be added to the conveyor (a).

The conveyor (a) moves the pre-assembled module to receive the next module.

The photovoltaic power generation module moved on the conveyor (a) is automatically transferred to the loading device (b), and the module transferred to the loading device (b) is loaded onto the loading cart (c).

Figure 2:
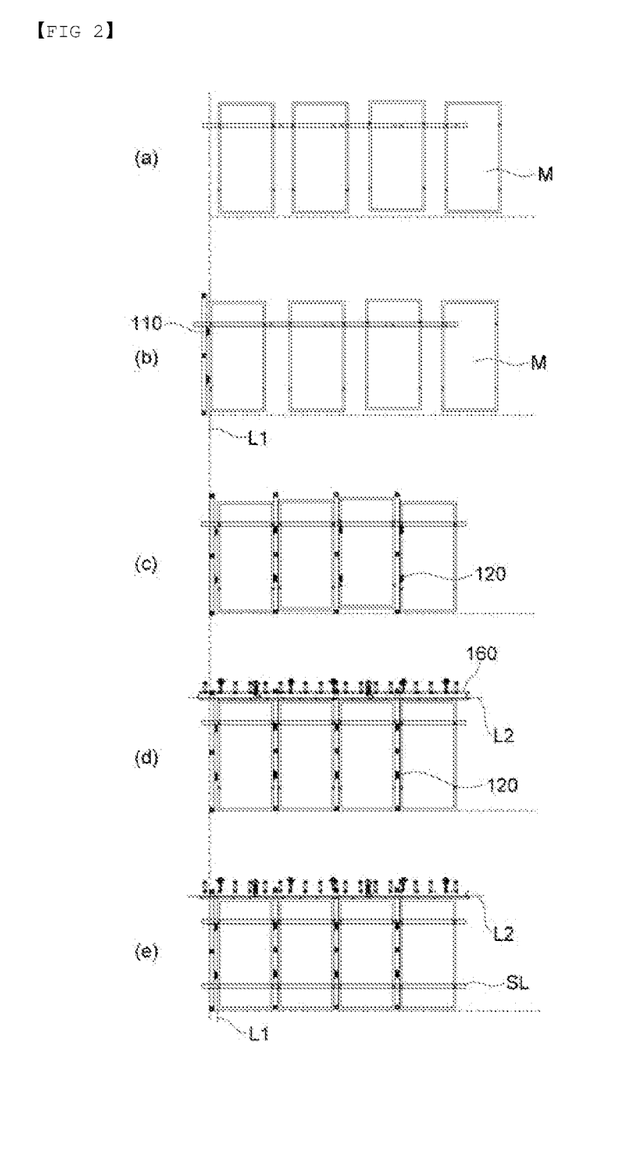
FIG. 2 is a view for explaining pre-assembly on a conveyor according to an embodiment of the present invention.
Figure 3:
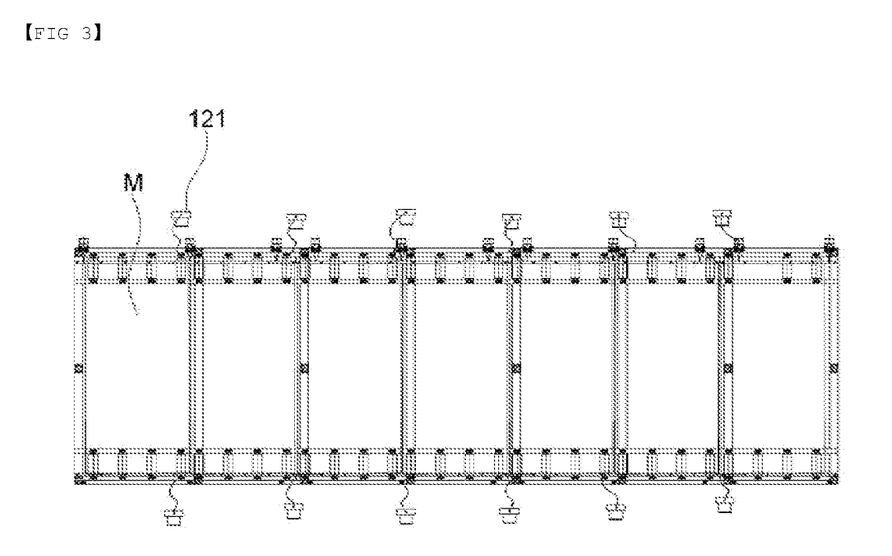
FIG. 3 is a plan view of a conveyor including a passive spacing material according to another embodiment of the present invention.
Figure 4:
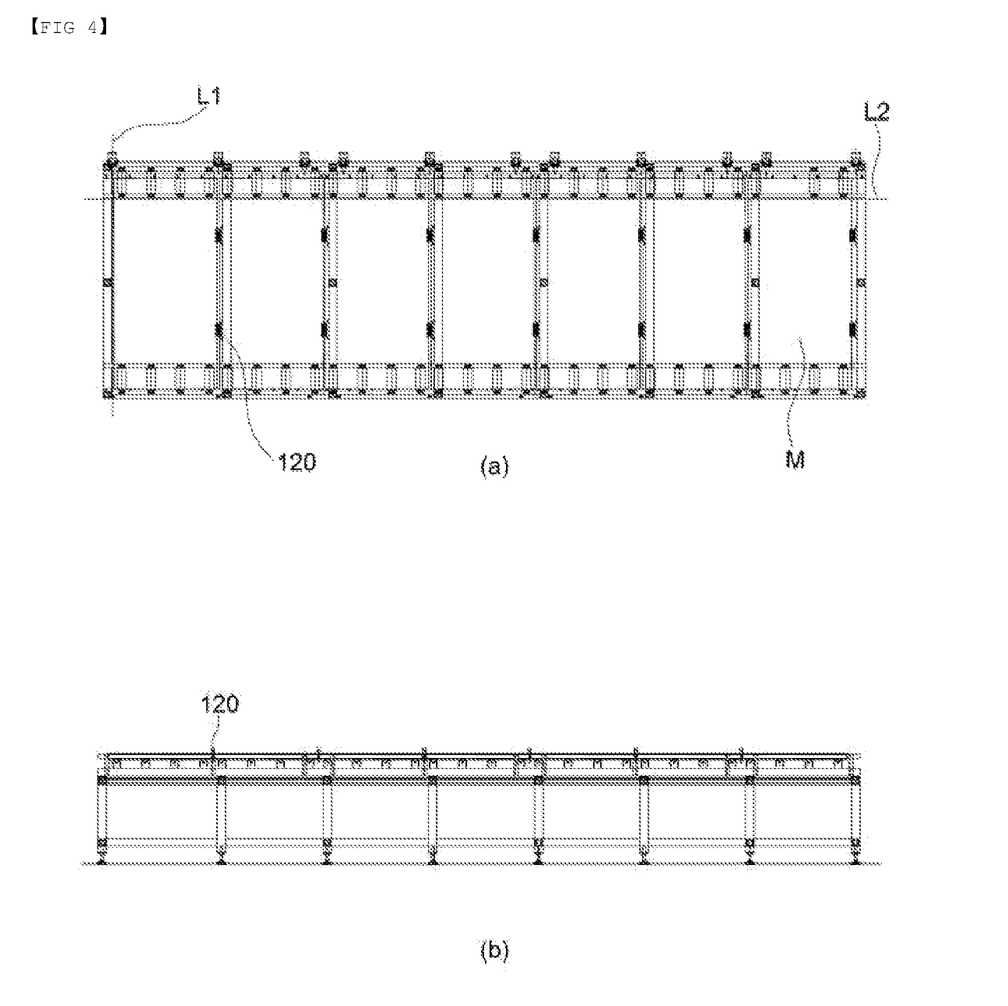

FIG. 2 is a view for explaining pre-assembly on a conveyor according to an embodiment of the present invention, FIG. 3 is a plan view of a conveyor including a passive spacing material according to another embodiment of the present invention, (a) of FIG. 4 is a plan view of a conveyor on which a string is disposed, and (b) of FIG. 4 is a side view of the conveyor on which the string is disposed.

A string assembled by a plurality of photovoltaic power generation modules is fixed to a module mounting structure (MMS), which is a support for a place to be installed later. Here, in order to easily install the string on the MSS, the string is manufactured by assembling the photovoltaic power generation modules in a process of pre-assembling a subrail assembled on the MMS.

In order to assemble the subrail to the string, a process of aligning the plurality of photovoltaic power generation modules is required.

Hereinafter, the process of aligning the photovoltaic power generation modules to connect the photovoltaic power generation modules to the subrail will be described with reference to FIGS. 2 to 4.

First, as illustrated in (a) of FIG. 2, the plurality of photovoltaic power generation modules M are disposed on the conveyor.

As illustrated in (b) of FIG. 2, an end stopper 110 is provided at one end of the conveyor to provide a vertical alignment line L1 for the photovoltaic power generation module that is disposed first. Here, vertical means a direction perpendicular to a transfer direction.

In an embodiment, one or more end stoppers 110 are provided at one end of the conveyor to stop the photovoltaic power generation modules M by blocking the movement of the photovoltaic power generation modules M disposed on the conveyor so that the photovoltaic power generation modules M are disposed on the vertical alignment line L1.

As illustrated in (C) of FIG. 2, in the conveyor, a spacing material 120 protrudes between the plurality of photovoltaic power generation modules M by a hydraulic pressure or a pneumatic pressure.

In an embodiment, the conveyor 100 includes a pneumatic cylinder provided on a lower frame on which the photovoltaic power generation module M is disposed.

The spacing material 120 that operates by the hydraulic or pneumatic pressure to protrude upward by the hydraulic pressure or pneumatic pressure output from the cylinder. Thus, the spacing material 120 stops the photovoltaic power generation module M to secure a spaced distance from the photovoltaic power generation module M that is transferred first. The spared distance may be 1 cm to 3 cm, and electrical resistance and noise between photovoltaic power generation modules may be prevented by the spaced distance.

In another modified example, referring to FIG. 3, a spacing material 121 may be inserted between the photovoltaic power generation modules M manually rather than the hydraulic pressure or pneumatic pressure.

As illustrated in (d) of FIG. 2, the conveyor includes a horizontal bar 130 providing a horizontal alignment line L2 for the plurality of photovoltaic power generation modules M.

The horizontal bar 130 allows the plurality of photovoltaic power generation modules M to be aligned in position by the horizontal alignment line L2.

In an embodiment, the horizontal bar 130 moves the plurality of photovoltaic power generation modules M by 1 cm to 2 cm in a horizontal direction to align horizontal lines of the plurality of photovoltaic power generation modules M.

As illustrated in (a) of FIG. 4 and (b) of FIG. 4, the plurality of photovoltaic power generation modules M are aligned in position by matching the vertical alignment line and the horizontal alignment line. Here, the proper position is a position at which bolt holes provided in the plurality of photovoltaic power generation modules M and bolt holes provided in the sublane SL are disposed on the same vertical line. In the plurality of photovoltaic power generation modules M and the sublane SL, which are arranged in the proper position, since the bolt holes are disposed in the same vertical line, and thus, a connection work is facilitated, and assembly work efficiency is improved.

Returning to FIG. 1 again, the string connected to the sublane SL is transferred to the loading cart (b) by the conveyor. Here, the loading device of the conveyor may be provided to be movable upward and downward, and thus, the string may be loaded onto the loading cart (b) using force ejected from the conveyor (a) without separate loading equipment.

In an embodiment, the conveyor may be provided as a turntable, and the photovoltaic power generation module may be rotated by the turntable to face upward. This is done for minimizing damage to the photovoltaic power generation module when a front surface is less sensitive than a rear surface when vacuum adsorbed and lifted, which will be described later.

The loading cart (b) may be moved to a position to be installed by a transport cart. The transport cart (c) travels at a speed of about 15 km/h in a loaded state and travels at a speed of 30 km/h when unloaded.

The string loaded on the loading cart (b) is unloaded by the lifting device (d) and placed on a pre-installed module mount.

The loading cart, the transport cart, and the lifting device will be described in detail below.

Figure 5:
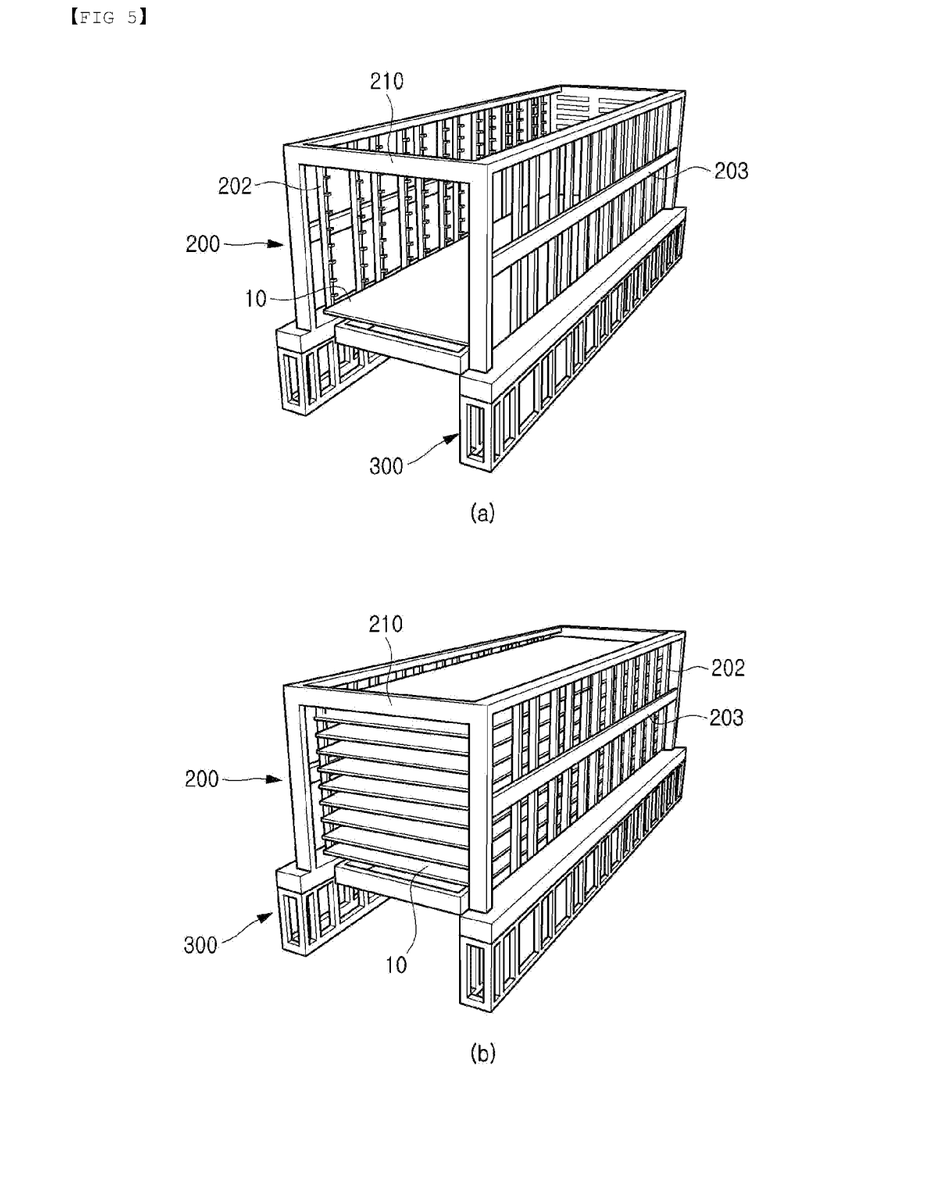
FIG. 5 is a perspective view of a loading cart according to an embodiment of the present invention.

FIG. 5 is a perspective view of a loading cart according to an embodiment of the present invention.

As illustrated in FIG. 5, a loading cart 200 according to an embodiment of the present invention includes a rectangular parallelepiped base frame 210 including a plurality of vertical frames 202 and horizontal frames 203 to provide an accommodation space for accommodating a photovoltaic power generation module and a spacer 220 provided in the plurality of vertical frames 202 to space strings laded in the accommodation space from each other.

That is, in the loading cart 200, the accommodation space is provided in the rectangular parallelepiped base frame 210. The accommodation space may be partitioned into a plurality of spaces by the spacer 220. Through this, the plurality of photovoltaic power generation modules 10, for example, 10 photovoltaic power generation modules may be spaced apart from and stacked on each other.

Each of the photovoltaic power generation modules is horizontally loaded in the space partitioned by the spacer 220. The photovoltaic power generation modules 10 are spaced apart from each other by spacers 220 so as to be stacked. Since a rear surface of the photovoltaic power generation module 10 is more sensitive to an impact than a front surface, it is preferable to place the front surface so as to face upward.

The spacer 220 may be mechanically operated without a separate power source and may be provided in a groove provided in the vertical frame 202 to partially protrude into the vertical frame 202.

The spacer 220 may be provided at a position corresponding to the vertical frame 202 facing each other to horizontally support the string 10 loaded in the accommodation space. At least a portion of the surface of the spacer 220 supporting the string 10 is made of an elastic material such as urethane, so that when the string is accommodated, the string 10 is supported without friction. In addition, when the elastic material is provided, the spacer 220 may stably support the string 10 even when vibrations or shocks that may occur during the process of transporting the loading cart in which the string is accommodated to the next installation process to prevent the string 10 from being damaged and broken.

In addition, the spacers 220 are arranged at regular intervals in the vertical frame 202. As a result, the photovoltaic power generation modules 10 may be accommodated at uniform intervals.

A transport cart 300 simply and easily transports the loading cart 200 to a corresponding destination.

In addition, a main body 310 may adopt a non-vibration pallet for absorbing an impact transmitted to the loading cart 200 and may additionally include a fixing member for fixing the loading cart 200.

The loading cart 200 may be moved to the next installation location by the transport cart 300.

Figure 6:
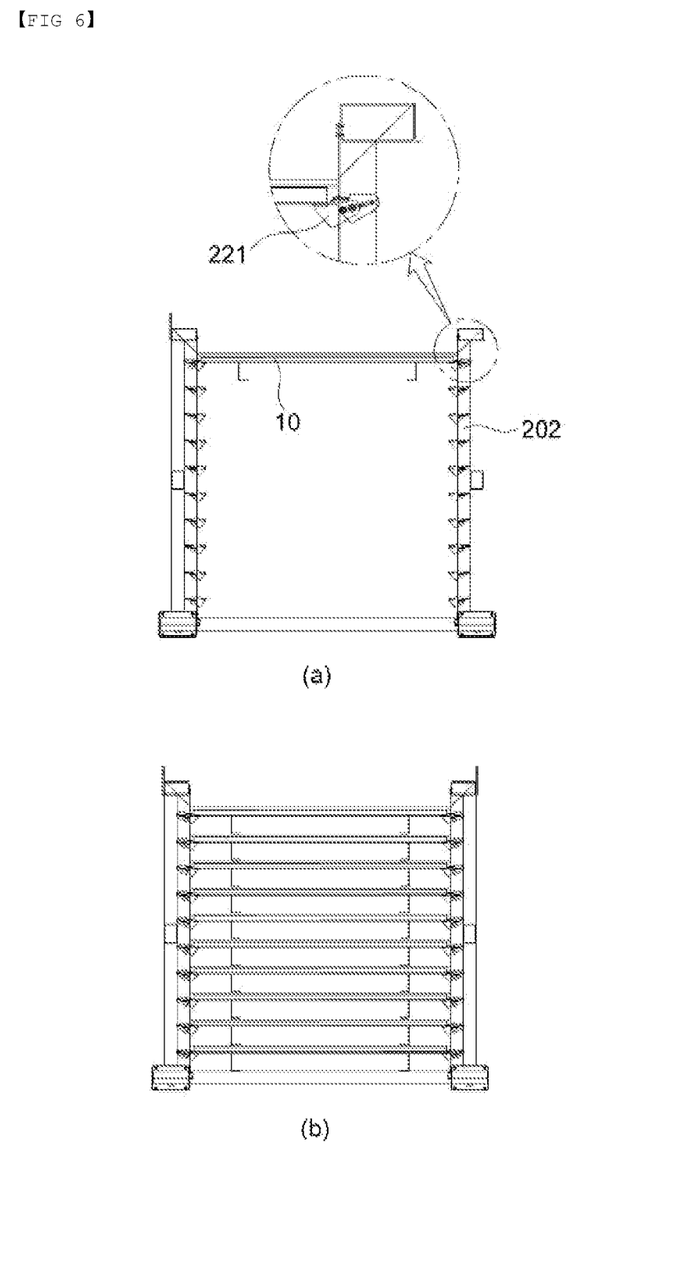
FIG. 6 is a view of a loading cart including a sliding-type spacer according to an embodiment of the present invention.

FIG. 6 is a view of a loading cart including a sliding-type spacer according to an embodiment of the present invention.

(a) of FIG. 6 illustrates a state in which one string is supported by a sliding-type spacer according to an embodiment of the present invention, and (b) of FIG. 6 is a view illustrating a state in which 10 strings are supported by sliding-type spacer.

Referring to FIG. 6, a sliding-type spacer 221 is disposed in the groove of the vertical frame 202, is fixed by two slidable fixing screws on an inclined groove defined in the groove, and has a triangular shape. When the fixing screw is slid down on the inclined groove, a portion of the spacer 221 protrudes toward the accommodation space to support the spring 10. When slid upward on the inclined groove, the entire spacer 221 is accommodated in the groove.

The sliding-type spacer 221 is provided at intervals of 5 cm to 15 cm, and a unit support load may be about 80 kg.

Figure 7:
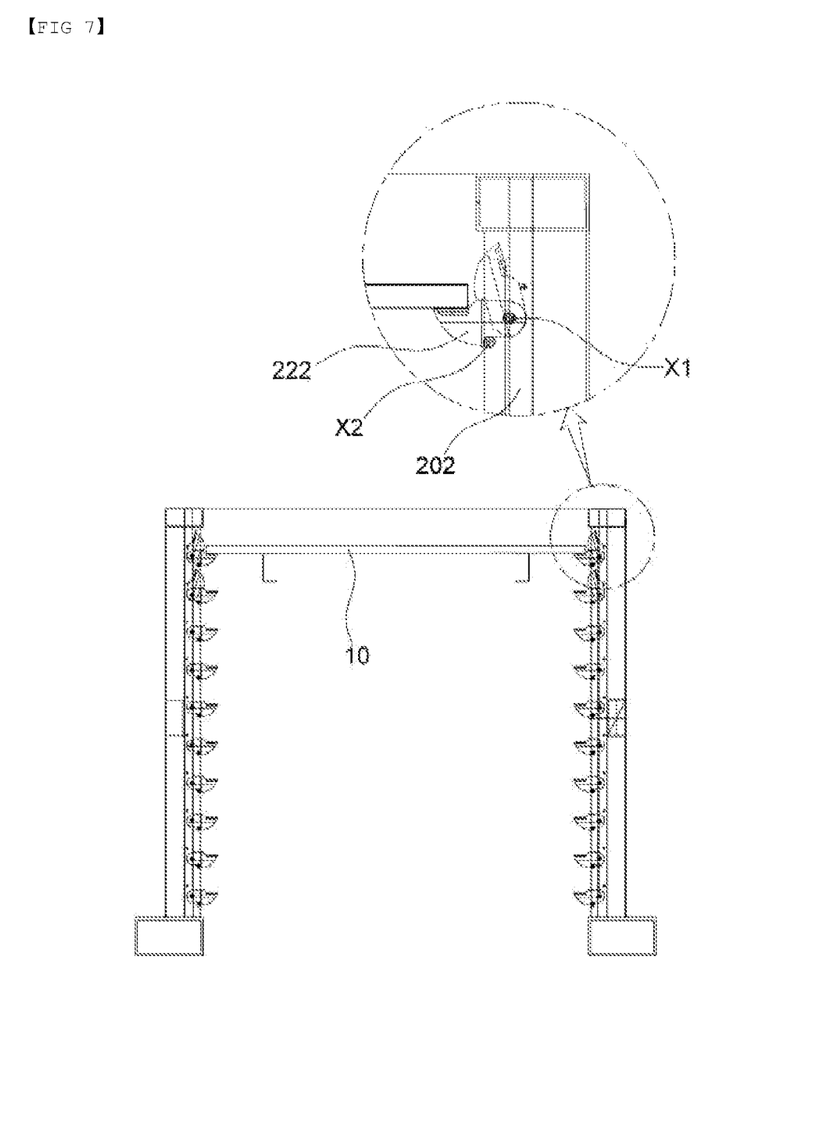
FIG. 7 is a view of a loading cart including a hatch-type spacer according to an embodiment of the present invention.

FIG. 7 is a view of a loading cart including a hatch-type spacer according to an embodiment of the present invention.

Referring to FIG. 7, a hatch-type spacer 222 is disposed in the groove of the vertical frame 202, and the hatch-type spacer may be rotatably fixed to the groove using a first fixing screw X1 as a rotation axis. The hatch-type spacer 222 may control a rotation angle of the spacer 222 by a second fixing screw X2 provided below the first fixing screw X1 to support the string 10.

As described above, the hatch-type spacer 222 may be inserted into the groove when the string 10 is loaded and unloaded and downward without a separate power source or may be disposed to protrude toward the accommodation space.

The hatch-type spacers 222 are provided at intervals of 15 cm to 20 cm, and a unit support load may be about 150 kg.

Figure 8:
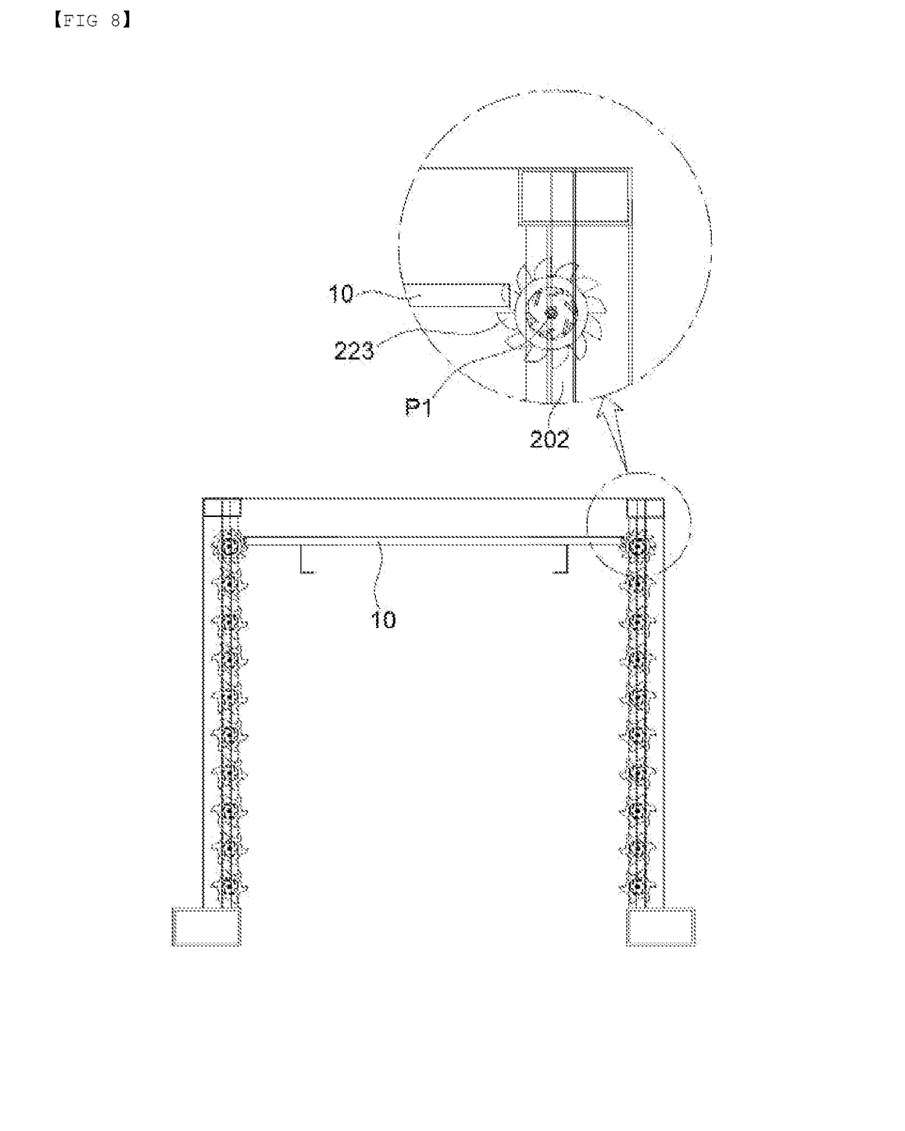
FIG. 8 is a view of a loading cart including a ratchet-type spacer according to an embodiment of the present invention.

FIG. 8 is a view of a loading cart including a ratchet-type spacer according to an embodiment of the present invention.

Referring to FIG. 8, a ratchet spacer 223 is a ratchet-shaped spacer that is disposed to be fixed in the groove of the vertical frame 202 by a fixing screw P1 and rotated in one direction using the fixing screw 1 as a rotation axis. A portion of a ratchet portion may be disposed to protrude toward the accommodation space, and when the string 10 is loaded and unloaded, the ratchet-type spacer 223 may be rotated only by a weight of the string 10, and thus, the ratchet-type spacer 223 may be provided at an interval of 3 cm to 8 cm, and a unit support load may be about 60 kg.

As described above, the hatch-type spacer 222 has a unit support load greater than that of the sliding-type spacer 221 or the ratchet-type spacer 223. The ratchet-type spacer 223 has a unit support load less than that of the sliding-type spacer 221.

As described above, since the spacer supports the string 10 and also returns to the groove of the vertical frame 202 of the loading cart, the spacer does not interfere when the next string is unloaded.

Figure 9:
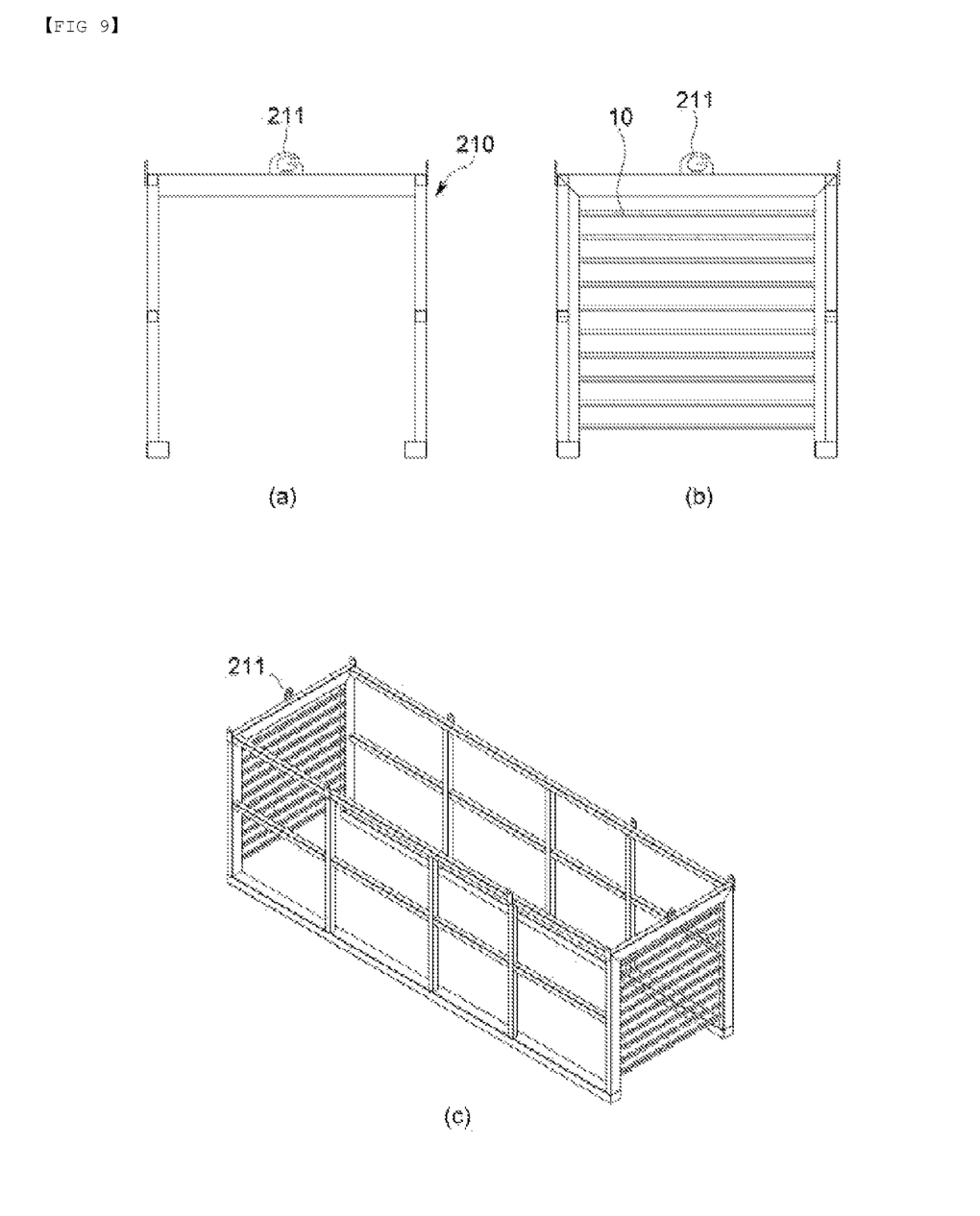
FIG. 9 is a view of a lading cart including a ring-shaped center marker according to an embodiment of the present invention.
Figure 10:
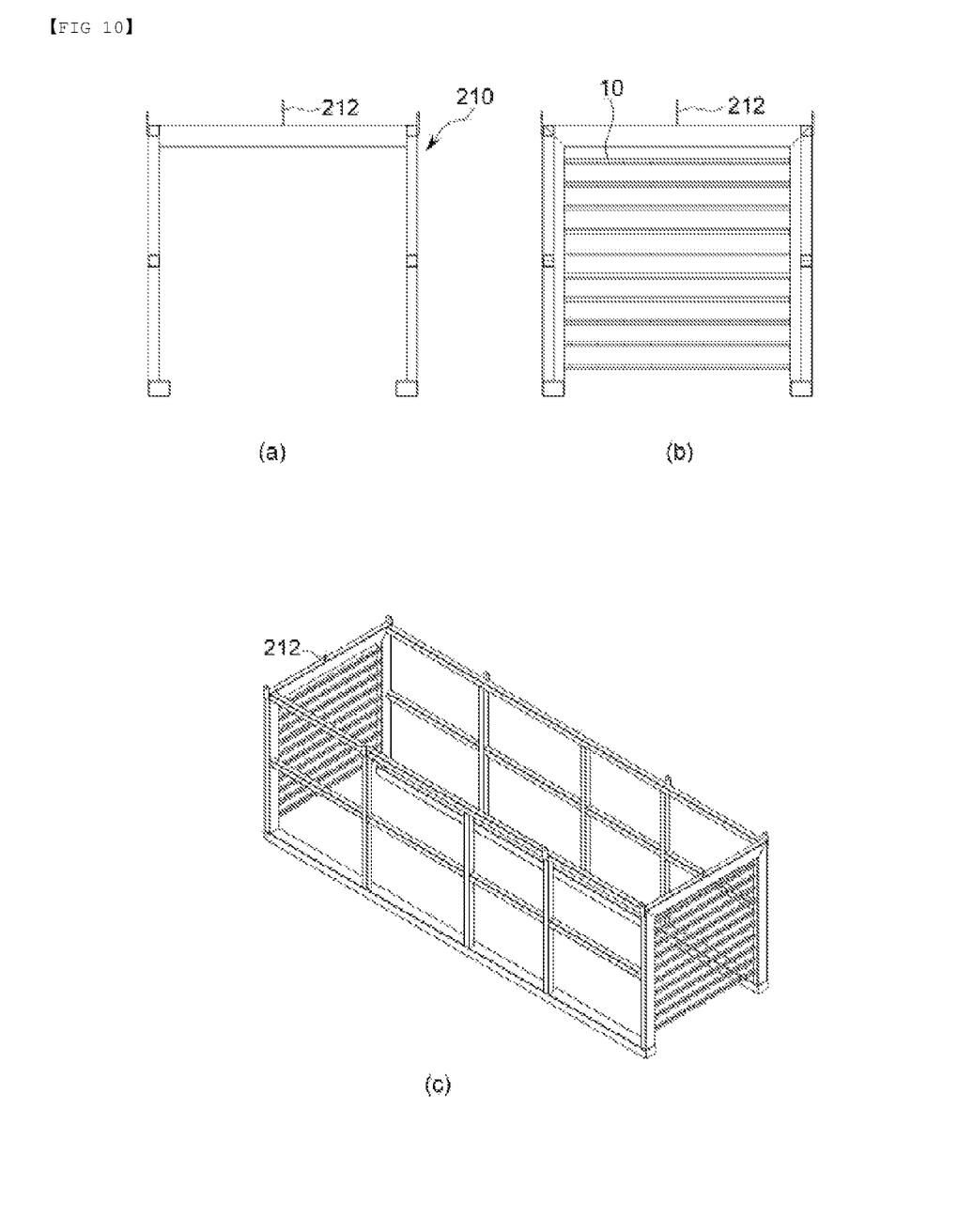
FIG. 10 is a view of a loading cart including a straight center marker according to an embodiment of the present invention.

FIG. 9 is a view of a lading cart including a ring-shaped center marker according to an embodiment of the present invention, and FIG. 10 is a view of a loading cart including a straight center marker according to an embodiment of the present invention.

When unloading the string loaded on the loading cart, a process of aligning a vacuum suction plate of the lifting device on the string is required.

For this, the loading cart includes a center marker at a center of the upper frame of the loading cart to guide the vacuum suction plate to a proper position of the string loaded on the loading cart.

At least one end of the lifting device is provided with an array string for an array. A worker may this string to match the center marker so that the vacuum suction plate is easily disposed at the proper position to improve work convenience.

The center marker may include a ring-shaped center marker as illustrated in FIG. 9 and a straight center marker as illustrated in FIG. 10.

The ring-shaped center marker 211 illustrated in FIG. 9 may have an alphabet G shape and easily adjust the position of the vacuum suction plate on the string 10 by hanging the array string on the G-shaped ring. The ring-shaped center marker is effective when a wind speed is low, or fine adjustment is required.

The straight center marker 212 illustrated in FIG. 10 may have an I-shaped alphabet and easily adjust the position of the vacuum suction plate on the string 10 based on the straight center marker. The straight center marker is effective when the wind speed is strong, or the fine adjustment is unnecessary.

Figure 11:
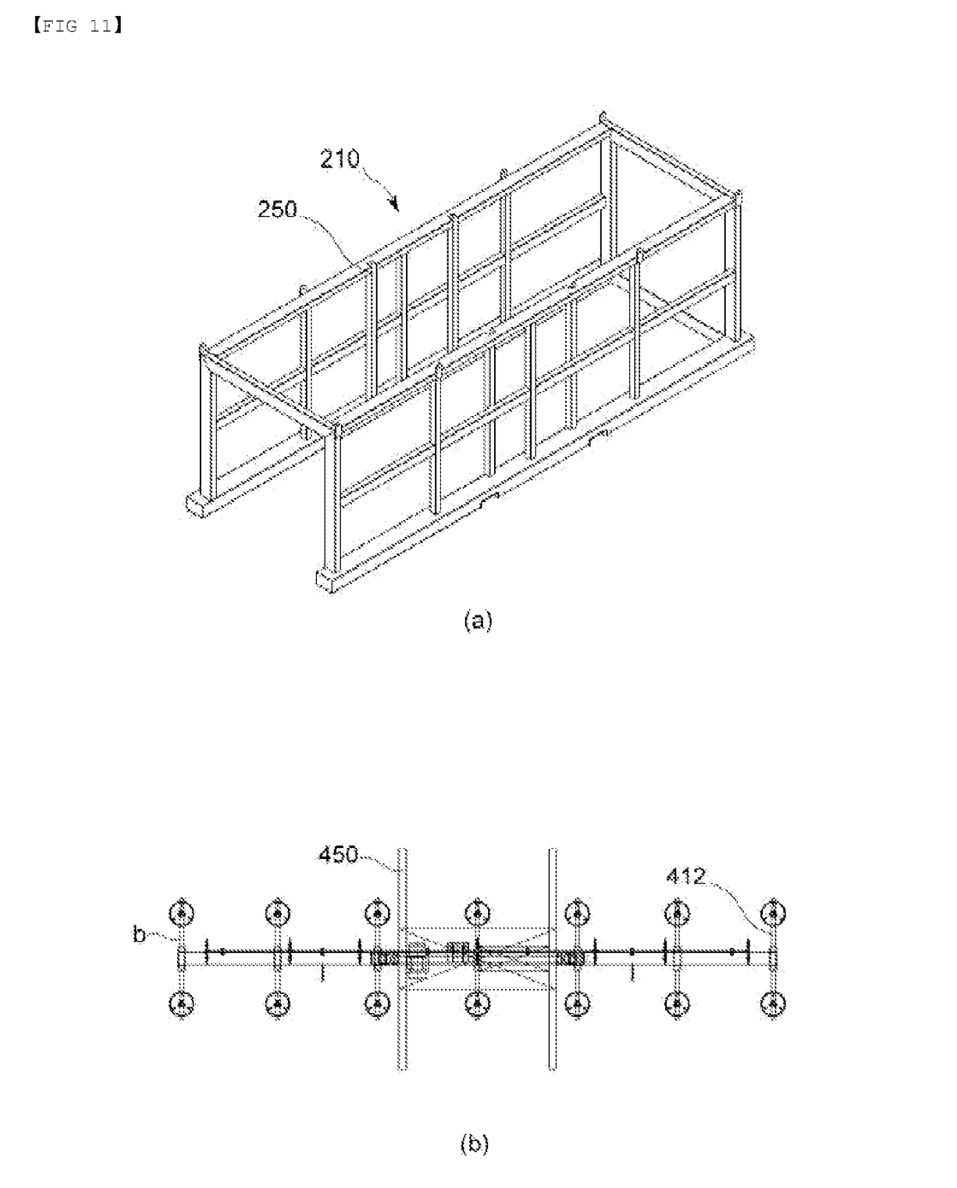
FIG. 11 is a view illustrating a loading cart and an example of a lifting device according to an embodiment of the present invention.

FIG. 11 is a view illustrating the loading cart and an example of the lifting device according to an embodiment of the present invention. (a) of FIG. 11 is a perspective view of the loading cart provided in a guide groove according to an embodiment of the present invention, and (b) of FIG. 11 is a plan view of the vacuum suction plate provided with a guide bar according to an embodiment of the present invention.

In order to unload the string loaded on the loading cart, the lifting device adsorbs the vacuum suction plate to the string and then lifts the vacuum suction plate. Here, in order to prevent the vacuum suction plate from being shaken, as illustrated in (a) of FIG. 11, an intaglio guide groove 250 is provided in the base frame of the loading cart.

The guide groove 250 may be provided in plurality in a direction perpendicular to a horizontal plane and may be provided in pair at corresponding positions of the facing frames so that the lifting device is maintained at a horizontal level when the vacuum suction plate ascends and descends in the loading cart.

As illustrated in (b) of FIG. 11, the lifting device may be a means for loading and unloading the string, and heavy equipment such as a crane or an excavator may be used as a driving means.

The lifting device includes an adsorption part 412 capable of adsorbing and lifting the string 10. The lifting device includes a horizontal support (a) and a plurality of vertical supports (b) extending from the horizontal support. An adsorption part 412 is provided on an end of the vertical support (b). The vertical supports (b) are symmetrically disposed around the horizontal supports (a).

The adsorption part 412 has a hollow therein and a through-hole at a central portion thereof. The through-hole is sealed and connected to a vacuum pump through a connection pipe. That is, when the vacuum pump is operated, air inside the adsorption part 412 is escaped to the outside along the connection pipe.

An outer circumferential ring having elasticity may be coupled to an outer circumference of the adsorption part 412. When the adsorption part 412 is placed on the string 10 to adsorb the string 10, damage of a contact surface with the adsorption part 412 of the photovoltaic power generation module 10 may be minimized.

The lifting device includes one or more guide bars longer than the vertical support (b). A length of the guide bar is shorter than a distance between the facing guide grooves provided in the loading cart and longer than a distance between the frames which is not provided with the guide grooves of the loading cart. As a result, the guide bar 450 of the lifting device is inserted into the guide groove 250 provided in the loading cart so that the string is maintained at a horizontal level and a proper position when the string ascends and descends in the loading cart.

The above-disclosed subject matter is to be considered illustrative, and not restrictive, and the appended claims are intended to cover all such modifications, enhancements, and other embodiments, which fall within the true spirit and scope of the present invention. Thus, the embodiment of the present invention is to be considered illustrative, and not restrictive, and the technical spirit of the present invention is not limited to the foregoing embodiment. Therefore, the scope of the present invention is defined not by the detailed description of the invention but by the appended claims, and all differences within the scope will be construed as being included in the present invention.

The invention claimed is:

1. A photovoltaic power generation module installation support system comprising:
   a conveyor device, which assembles a plurality of photovoltaic power generation modules with one string and moves the plurality of photovoltaic power generation modules in one direction; and
   a loading cart comprising an accommodation space in which the string moved from the conveyor device is loaded in a direction parallel to the ground,
   wherein the conveyor device comprises one or more end stoppers configured to provide a vertical alignment line of the photovoltaic power generation module that is disposed first at one end of the conveyor device,
   a spacing material protruding between the plurality of photovoltaic power generation modules to secure a spaced distance between the photovoltaic power generation modules; and
   a horizontal bar configured to a horizontal alignment line of the plurality of photovoltaic power generation modules,
   wherein the conveyor device comprises a cylinder which is provided in a lower frame, on which the photovoltaic power generation modules are disposed, and is operated by a pneumatic pressure or hydraulic pressure, and
   the spacing material protrudes between the photovoltaic power generation modules by a pneumatic cylinder.

2. The photovoltaic power generation module installation support system of claim 1, further comprising:
   a lifting device comprising a vacuum suction plate configured to generate a vacuum pressure so as to adsorb an uppermost surface of the photovoltaic power generation modules accommodated and stacked in the accommodation space, thereby unloading the photovoltaic power generation modules; and
   a transport vehicle configured to load and transport the loading cart,
   wherein the loading cart further comprises a center marker configured to mark a center of an upper frame of a base frame of the loading cart,
   wherein the center marker comprises any one of a ring-shaped center marker and a straight center marker.

3. The photovoltaic power generation module installation support system of claim 2, wherein the lifting device comprises a horizontal support and a vertical support, and a guide bar, wherein the horizontal support and the vertical support fix the vacuum suction plate, and the guide bar has a length greater than a length of the vertical support, and
   the loading cart comprises a guide groove provided so that the guide bar is inserted to be movable in a vertical direction, wherein the guide groove is disposed in a direction perpendicular to a horizontal plane on the base frame of the loading cart and is provided in pair at corresponding positions of facing frames of the loading cart.

4. A photovoltaic power generation module installation support system comprising:
   a conveyor device, which assembles a plurality of photovoltaic power generation modules with one string and moves the plurality of photovoltaic power generation modules in one direction; and
   a loading cart comprising an accommodation space in which the string moved from the conveyor device is loaded in a direction parallel to the ground,
   wherein the conveyor device comprises one or more end stoppers configured to provide a vertical alignment line of the photovoltaic power generation module that is disposed first at one end of the conveyor device,
   wherein the loading cart comprises:
   a rectangular parallelepiped base frame comprising a plurality of vertical frames and horizontal frames; and
   a spacer provided to be slidable or rotatable in a groove provided in each of the plurality of vertical frames so that a portion of the spacer is disposed to protrude toward the accommodation space,
   wherein the spacer comprises a triangular sliding-type spacer having a triangular shape that is slidable by a fixing screw on an inclined groove disposed in the groove, and
   wherein the spacer comprises a hatch-type spacer that is rotatable by using a first fixing screw disposed in the groove as a rotation axis and is configured to control a rotation angle by a second fixing screw provided below the first fixing screw so as to support the string.

5. A photovoltaic power generation module installation support system comprising:
   a conveyor device, which assembles a plurality of photovoltaic power generation modules with one string and moves the plurality of photovoltaic power generation modules in one direction; and
   a loading cart comprising an accommodation space in which the string moved from the conveyor device is loaded in a direction parallel to the ground,
   wherein the conveyor device comprises one or more end stoppers configured to provide a vertical alignment line of the photovoltaic power generation module that is disposed first at one end of the conveyor device,
   wherein the loading cart comprises:
   a rectangular parallelepiped base frame comprising a plurality of vertical frames and horizontal frames; and a spacer provided to be slidable or rotatable in a groove provided in each of the plurality of vertical frames so that a portion of the spacer is disposed to protrude toward the accommodation space, and wherein the spacer comprises a ratchet-type spacer that is rotated in one direction by using a fixing screw fixed to the groove as a rotation axis, wherein a portion of a ratchet portion of the ratchet-type spacer is disposed to protrude toward an accommodation groove.

* * * * *